United States Patent
Ochiai et al.

(10) Patent No.: US 9,686,095 B2
(45) Date of Patent: Jun. 20, 2017

(54) NETWORK ANALYSIS DEVICE, MANAGEMENT SYSTEM, NETWORK ANALYSIS METHOD AND PROGRAM

(75) Inventors: Akihiro Ochiai, Tokyo (JP); Noriyuki Komiya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 136 days.

(21) Appl. No.: 14/362,651

(22) PCT Filed: Dec. 7, 2011

(86) PCT No.: PCT/JP2011/078293
§ 371 (c)(1),
(2), (4) Date: Jun. 4, 2014

(87) PCT Pub. No.: WO2013/084316
PCT Pub. Date: Jun. 13, 2013

(65) Prior Publication Data
US 2014/0359106 A1 Dec. 4, 2014

(51) Int. Cl.
*G06F 15/173* (2006.01)
*H04L 12/28* (2006.01)
(Continued)

(52) U.S. Cl.
CPC .......... *H04L 12/2823* (2013.01); *H04L 41/22* (2013.01); *H04L 41/50* (2013.01);
(Continued)

(58) Field of Classification Search
CPC .................... H04L 12/5692; H04L 43/0876
(Continued)

(56) References Cited

U.S. PATENT DOCUMENTS 6,169,610 B1 * 1/2001 Wakasugi .......... H04N 1/00209
358/407
6,545,768 B1 * 4/2003 Matsubara ......... H04N 1/00209
358/1.15
(Continued)

FOREIGN PATENT DOCUMENTS

JP 3429145 B2 7/2003
JP 2005-253082 A 9/2005
(Continued)

OTHER PUBLICATIONS

Extended European Search Report mailed Jun. 30, 2015 in the corresponding EP application No. 11876891.0.
(Continued)

*Primary Examiner* — Kristie Shingles
(74) *Attorney, Agent, or Firm* — Posz Law Group, PLC

(57) ABSTRACT

An electronic message information collector collects packets transferred on a building management system network and analysis results as first electronic message information. A storage stores the first electronic message information collected by the electronic message information collector. An electronic message information collector collects packets transferred on an equipment network and analysis results as second electronic message information. A storage stores the second electronic message information collected by the electronic message information collector. An electronic message associator associates the first electronic message information stored in the storage and the second electronic message information stored in the storage. A display displays the analysis results of the association by the electronic message associator.

8 Claims, 11 Drawing Sheets

(51) Int. Cl.
*H04L 12/26* (2006.01)
*H04L 12/24* (2006.01)
(52) U.S. Cl.
CPC .......... *H04L 43/04* (2013.01); *H04L 43/0817* (2013.01); *H04L 2012/285* (2013.01)
(58) Field of Classification Search
USPC ........................................................ 709/218
See application file for complete search history.

(56) References Cited

U.S. PATENT DOCUMENTS

| | | | |
|---|---|---|---|
| 7,259,666 | B1 | 8/2007 | Hermsmeyer et al. |
| 8,130,793 | B2 * | 3/2012 | Edwards ............... H04M 15/00 370/486 |
| 9,094,257 | B2 * | 7/2015 | Morrill ............. H04L 29/06027 |
| 2002/0133588 | A1 | 9/2002 | Doyle et al. |
| 2003/0214963 | A1 | 11/2003 | Moody et al. |
| 2005/0195745 | A1 | 9/2005 | Scott et al. |
| 2010/0138539 | A1 * | 6/2010 | Neville ................... H04L 45/00 709/226 |
| 2011/0145391 | A1 | 6/2011 | Ivershen |
| 2012/0321052 | A1 * | 12/2012 | Morrill ............. H04L 29/06027 379/32.01 |
| 2012/0330804 | A1 * | 12/2012 | Morrill ................. H04M 15/00 705/34 |

FOREIGN PATENT DOCUMENTS

| | | |
|---|---|---|
| JP | 2008-160356 A | 7/2008 |
| JP | 2010-108382 A | 5/2010 |
| JP | 4513506 B2 | 7/2010 |

OTHER PUBLICATIONS

International Search Report of the International Searching Authority mailed Jan. 31, 2012 for the corresponding international application No. PCT/JP2011/078293 (and English translation).
Office Action mailed Sep. 24, 2014 issued in corresponding JP patent application No. 2013-548004 (and partial English translation).
Office Action dated Jun. 21, 2016 issued in corresponding CN patent application No. 201180075323.1 (and English translation).
Office Action dated May 31, 2016 issued in corresponding EP patent application No. 11 876 891.0.
Office Action dated Dec. 26, 2016 issued in corresponding CN patent application No. 201180075323.1 (and English translation).

* cited by examiner

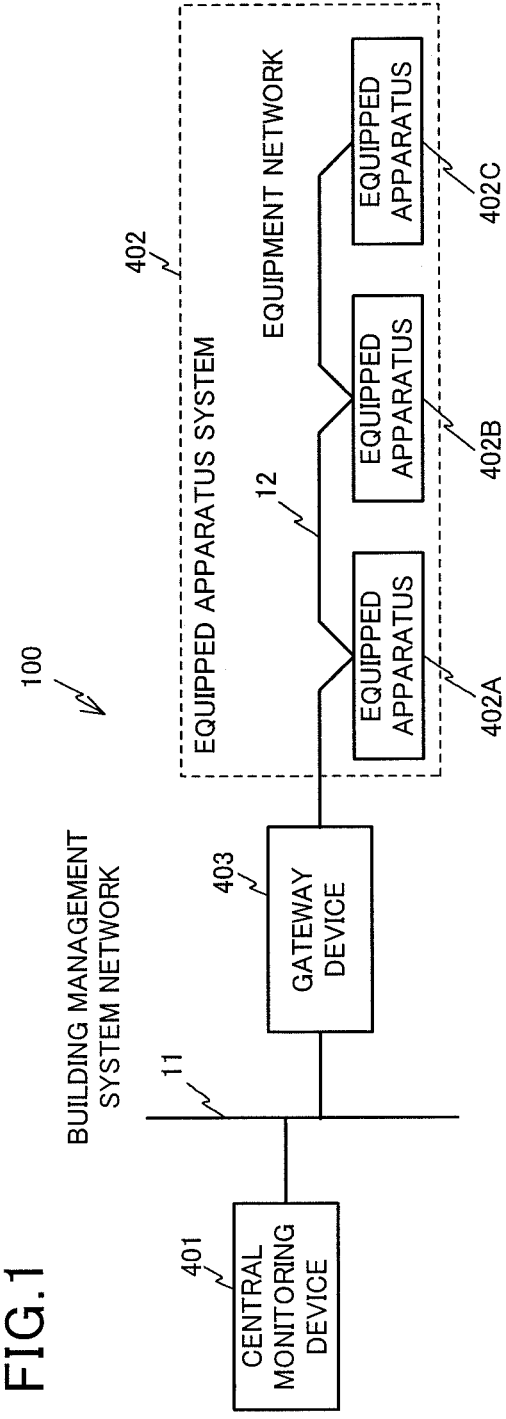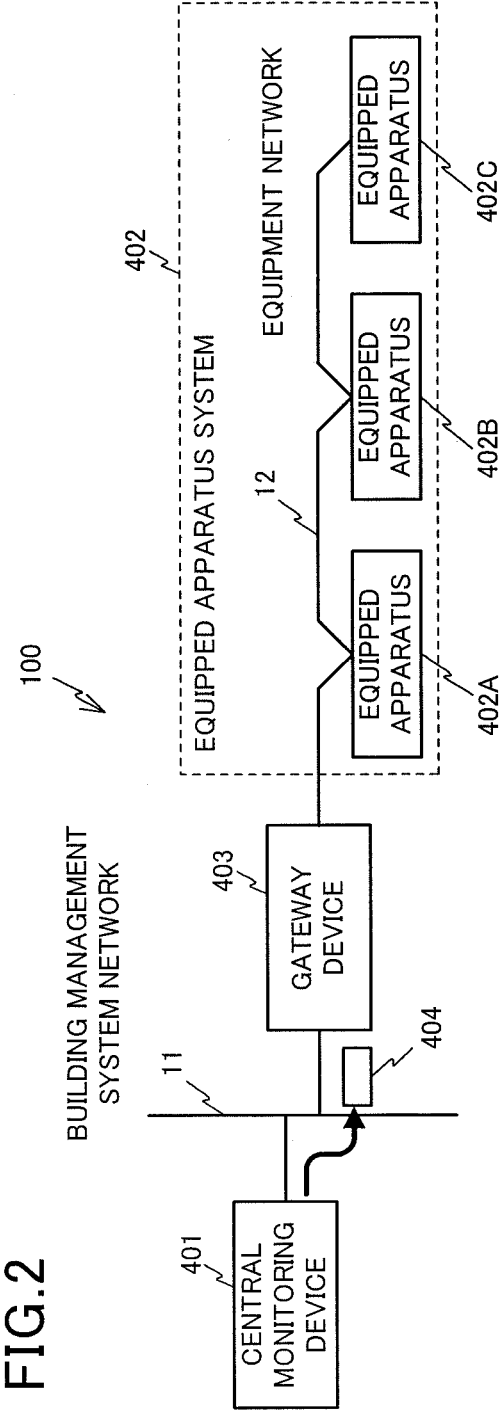

NETWORK ANALYSIS DEVICE, MANAGEMENT SYSTEM, NETWORK ANALYSIS METHOD AND PROGRAM

CROSS REFERENCE TO RELATED APPLICATION

This application is a U.S. national stage application of International Application No. PCT/JP2011/0078293 filed on Dec. 7, 2011, the disclosure of which is incorporated by reference.

TECHNICAL FIELD

The present disclosure relates to a network analysis device, a management system, a network analysis method, and a program.

BACKGROUND ART

Recently, building management systems for managing and controlling the equipped apparatuses such as air-conditioners installed in a building using a given monitoring device have been developed. In a prior art building management system, generally, a central monitoring device connected to an upper-level network such as a LAN (local area network) or WAN (wide area network) manages (monitors)/controls multiple equipped apparatuses connected by a lower-level network via a gateway device.

The gateway device is connected between the upper-level network to which the monitoring device is connected and the lower-level network to which the equipped apparatuses are connected. The gateway device converts data (packets) sent from the monitoring device to data processable by the equipped apparatuses and converts data sent from the equipped apparatuses to data processable by the monitoring device. In other words, the gateway device conducts inter-conversion between the upper-level network protocol used in processing by the monitoring device and the lower-level network protocol used in processing by the equipped apparatuses.

As an example of the above-described gateway device, a gateway device that can connect the lower-level networks of proprietary specifications that are provided by multiple different vendors who are the providers of the equipped apparatuses to the upper-level network is provided (for example, see Patent Literature 1). This gateway device enables each of the multiple vendors to easily configure a lower-level network of a proprietary specification.

In 2003, BACnet (a data communication protocol for building automation and control networks), which is one of the typical upper-level network protocols, was set forth as an international standard ISO16484-5. Since then, an increasing number of vendors provide a device in compliance with the BACnet set forth as an international standard.

The BACnet is often used for a large-scale building. This is because the BACnet standard is suitable for management of a large-scale building. With the BACnet, a gateway device manages a significantly great number of equipped apparatuses and many gateway devices can be connected to the equipment networks.

The above-mentioned central monitoring device, gateway device, and equipped apparatuses constituting a building management system are often provided by different vendors. In such a case, each vendor can conduct a thorough operation verification test on its own device by itself. However, it is not easy to conduct an operation verification test substantially covering the condition after the building management system is actually built.

For that reason, more than a few unexpected problems occur after the building management system is built and actually operated. In order to solve the problems, it is necessary to collect and analyze electronic messages travelling on the networks to acknowledge the situation and identify where the problem occurred and what the problem is. In such analysis, it is necessary to clarify what kind of events occur on the upper-level network and on the lower-level network, respectively, and what kind of cause-effect relationship the events have. In consideration of such circumstances, there is an increasing demand for improved work efficiency regarding collection of electronic messages travelling on multiple networks simultaneously and analyzing the cause-effect relationship between the electronic messages.

As an example of the network analysis device, a network analyzer comprising multiple measuring terminals, a single main frame, and a single terminal adaptor is disclosed (for example, see Patent Literature 2). The multiple measuring terminals measure measurement objects. The main frame controls the measuring terminals and analyzes/evaluates measurement signals received from the measuring terminals. The terminal adaptor switches the connection of the main frame to one of the measuring terminals in a time division manner.

CITATION LIST

Patent Literature

Patent Literature 1: Japanese Patent No. 4513506; and
Patent Literature 2: Japanese Patent No. 3429145.

SUMMARY OF INVENTION

Technical Problem

In order to analyze the cause-effect relationship between electronic messages transferred on multiple networks connected to each other, it is necessary to associate the electronic messages transferred on the networks with each other. However, the network analyzer disclosed in the above Patent Literature 2 only collects electronic message information transferred on multiple networks individually.

Therefore, in order to analyze the cause-effect relationship between the electronic messages using the above network analyzer, the worker himself has to associate the electronic messages by arranging an enormous amount of electronic message information on the multiple networks in the order of, for example, reception time for analyzing the cause-effect relationship between electronic messages transferred on the networks. Such a work imposes a heavy workload on the worker.

The present disclosure is invented with the view of the above circumstances and an exemplary objective of the present disclosure is to provide a network analysis device, a management system, a network analysis method, and a program for improving the work efficiency in analyzing electronic messages transferred on multiple networks connected to each other.

Solution to Problem

In order to achieve the above objective, the network analysis device according to the present disclosure comprises:

a first electronic message information collector collecting first electronic message information regarding electronic messages transferred on a first network;

a first storage storing the first electronic message information collected by the first electronic message information collector;

a second electronic message information collector collecting second electronic message information regarding electronic messages transferred on a second network;

a second storage storing the second electronic message information collected by the second electronic message information collector;

an electronic message associator associating the first electronic message information stored in the first storage and the second electronic message information stored in the second storage based on protocol interconversion scheme information between the first network and the second network; and a display displaying the results of association by the electronic message associator.

Advantageous Effects of Invention

The present disclosure can present first electronic message information transferred on a first network and second electronic message information transferred on a second network to the worker in a mutually associated manner. Thus, the worker can easily acknowledge the situation and identify where the problem occurred and what the problem is in a short time. Consequently, the work efficiency in analyzing electronic messages traveling on multiple networks connected to each other can be improved.

BRIEF DESCRIPTION OF DRAWINGS

FIG. 1 is a block diagram showing the general configuration of a building management system to which the network analysis device according to Embodiment 1 of the present disclosure is applied;

FIG. 2 is a block diagram showing a packet being sent from the central monitoring device to the gateway device in FIG. 1;

DESCRIPTION OF EMBODIMENTS

Figure 3:
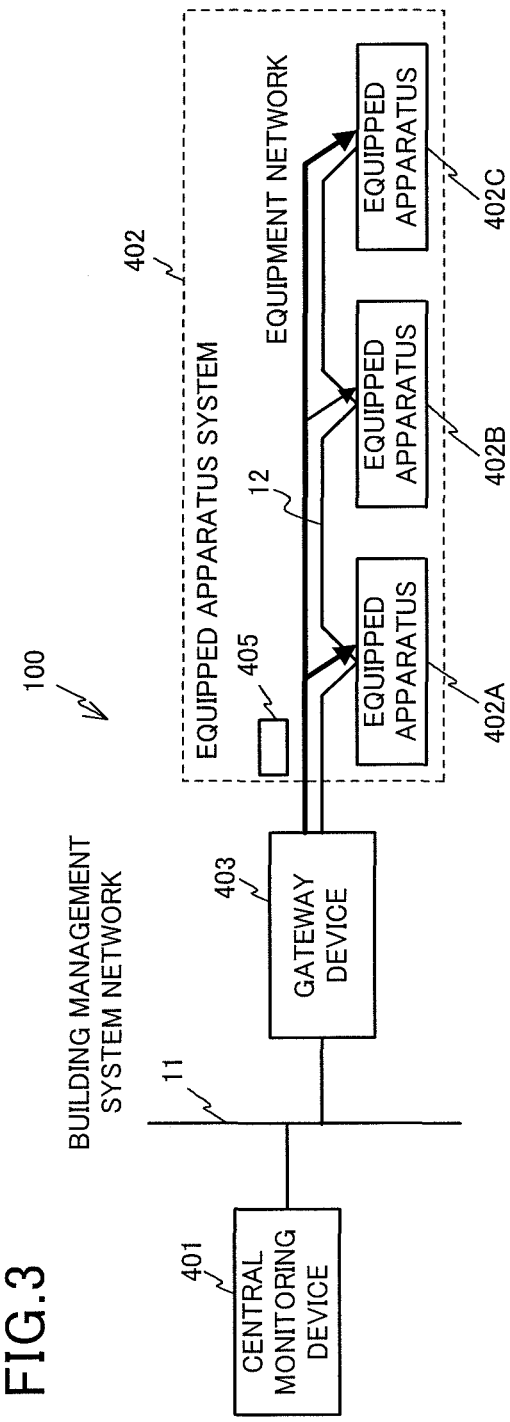
FIG. 3 is a block diagram showing a packet being sent from the gateway device to the equipped apparatuses in FIG. 1.

Embodiments of the present disclosure will be described with reference to the drawings.

Embodiment 1

Embodiment 1 of the present disclosure will be described. First, the configuration and operation of a building management system to which the network analysis device according to this embodiment is applied will be described. FIG. 1 shows the configuration of a building management system 100. As shown in FIG. 1, the building management system 100 comprises a central monitoring device 401, an equipped apparatus system 402, and a gateway device 403.

The central monitoring device 401 is a computer connected to a building management system network 11. The building management system network 11 is the upper-level network of the building management system 100. In this embodiment, the building management system network 11 corresponds to the first network.

The equipped apparatus system 402 comprises multiple equipped apparatuses 402A, 402B, and 402C. The equipped apparatuses 402A, 402B, and 402C are connected to each other via an equipment network 12. The equipped apparatuses 402A, 402B, and 402C also have a computer communicable via the equipment network 12. The computer executes programs in accordance with commands and requests received via the equipment network 12 for operation and has the function of returning the response via the equipment network 12. The equipped apparatuses 402A, 402B, and 402C are, for example, air-conditioning devices or lighting apparatuses. The equipment network 12 is the lower-level network of the building management system 100. In this embodiment, the equipment network 12 corresponds to the second network.

The gateway device 403 connects the building management system network 11 and equipment network 12. The gateway device 403 relays the packets transferred on the building management system network 11 and equipment network 12. The gateway device 403 is a computer executing programs to conduct a procedure to convert the electronic messages transferred on one network to the electronic messages transferred on the other network in relaying the electronic messages.

The building management system 100 will be described in more detail.

The central monitoring device 401 operates the equipped apparatus system 402 and monitors the state of the equipped apparatus system 402 via the gateway device 403. As shown in FIG. 2, the central monitoring device 401 sends out on the building management system network 11 a packet 404 as an instruction to operate the equipped apparatuses or a command to order the equipped apparatuses to report their states. The packet 404 is received by the gateway device 403.

When the received packet 404 is destined for the equipped apparatuses 402A to 402C connected to the equipment network 12 of the equipped apparatus system 402, the gateway device 403 converts the received packet 404 to a packet 405 on the equipment network 12. The gateway device 403 sends the packet 405 to the equipped apparatuses 402A, 402B, and 402C as shown in FIG. 3.

Figure 4:
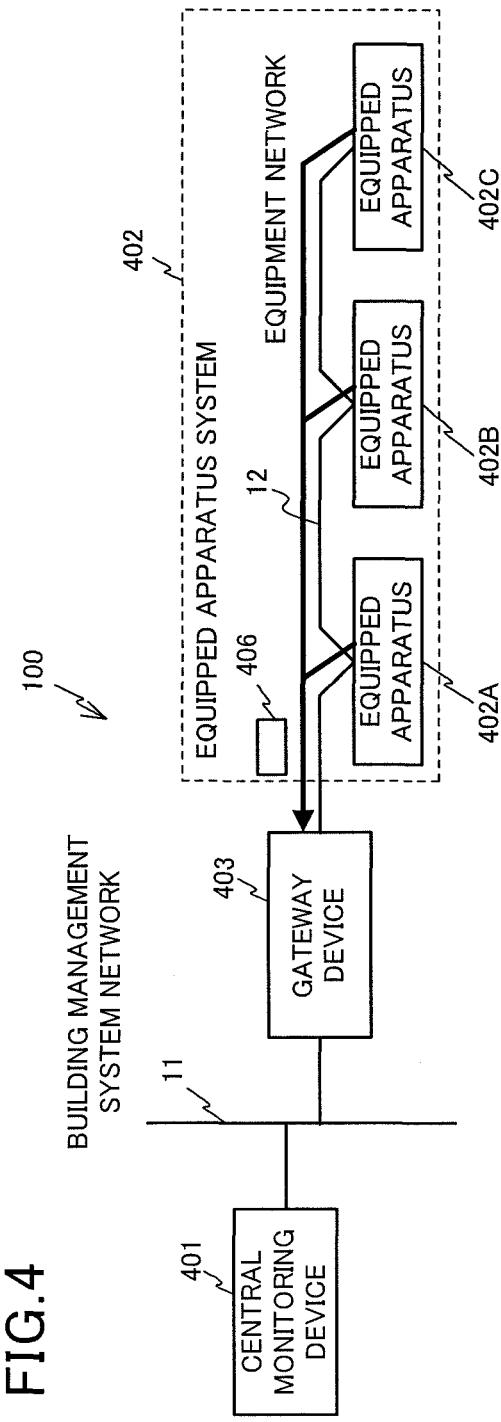
FIG. 4 is a block diagram showing a packet being sent from the equipped apparatuses to the gateway device in FIG. 1.

The response to the packet 405 as a command, or the report on state change or the like from the equipped apparatuses 402A, 402B, and 402C, is sent out from the equipped apparatuses 402A, 402B, and 402C as a packet 406 on the equipment network 12 as shown in FIG. 4. The packet 406 is received by the gateway device 403.

Figure 5:
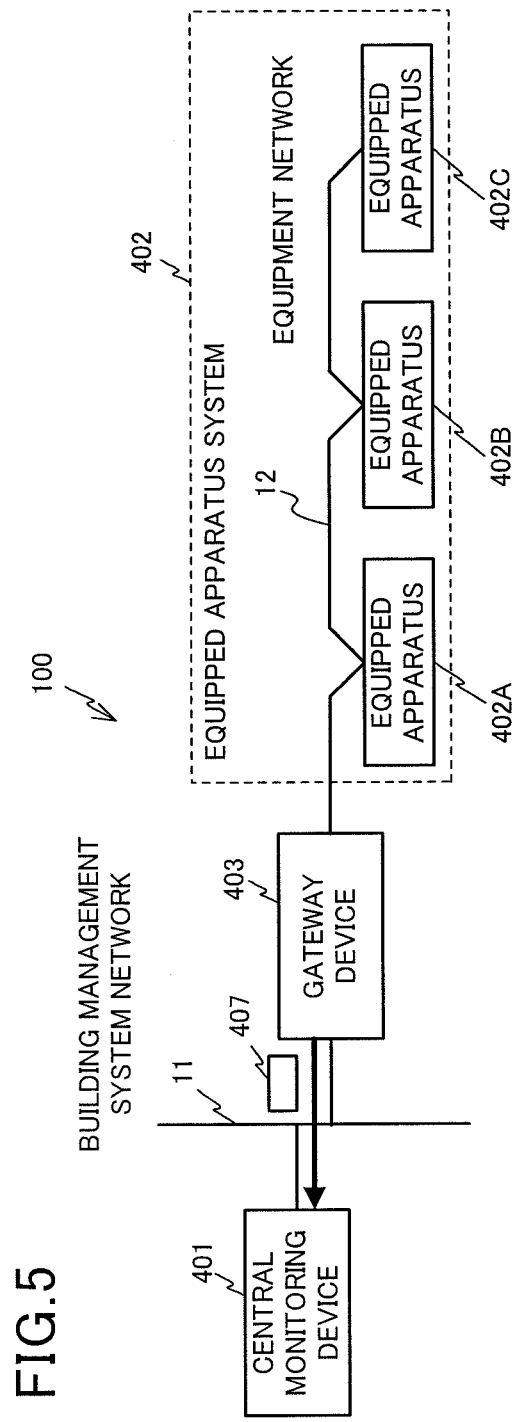
FIG. 5 is a block diagram showing a packet being sent from the gateway device to the central monitoring device in FIG. 1.

The gateway device 403 converts the packet 406 to a packet 407 on the building management system network 11 as shown in FIG. 5. The gateway device 403 sends out the packet 407 on the building management system network 11. The packet 407 is received by the central monitoring device 401.

The central monitoring device 401 confirms that the equipped apparatuses 402A, 402B, and 402C constituting the equipped apparatus system 402 are operated normally or monitors the states of the equipped apparatuses 402A, 402B, and 402C based on the contents of the received packet 407.

In the building management system 100, the central monitoring device 401 transmits/receives packets to/from the equipped apparatuses 402A to 402C via the building management system network 11, gateway device 403, and equipment network 12 as described above. This transmission/reception of packets enables various operations and monitoring of the equipped apparatuses 402A to 402C. Therefore, in order to know the operation state of the building management system 100, it is necessary to comprehend the state of interconversion of the packets 404 to 407 in the gateway device 403 and the state of bidirectional transmission/reception of the packets 404 to 407 around the gateway device 403.

The network analysis device according to this embodiment simultaneously collects/analyzes electronic message information on multiple networks such as the building management system network 11 and equipment network 12 connected to either end of the gateway device 403. This network analysis device retains a protocol interconversion scheme executed within the gateway device 403, and associates commands mutually with reference to the scheme, and presents the results of association to the worker. In this way, the worker can easily acknowledge the operation state of the building management system 100. For example, when a problem occurs, the worker can efficiently identify where the problem occurred and identify what the problem is.

Figure 6:
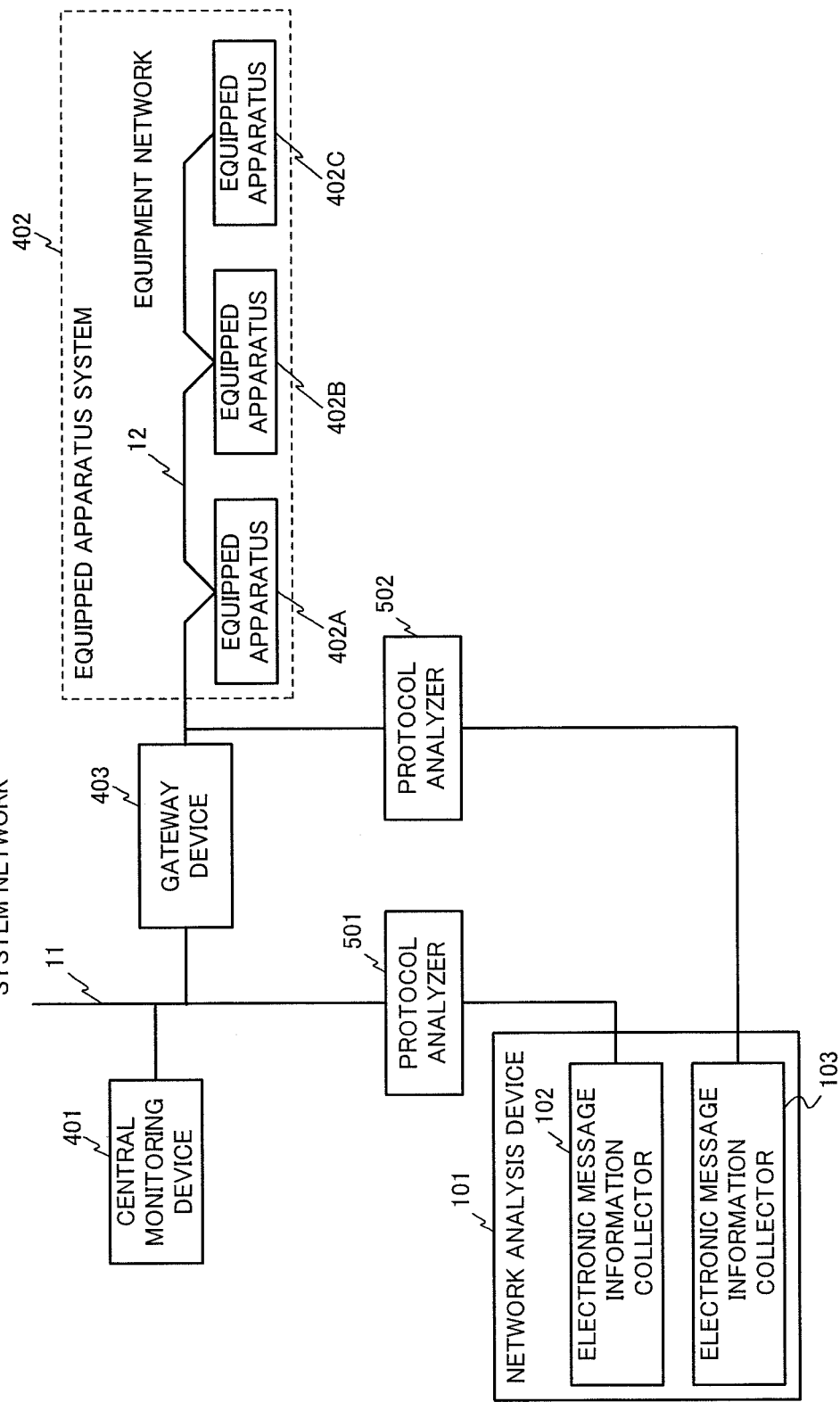
FIG. 6 is a block diagram showing an exemplary connection topology of the network analysis device according to Embodiment 1 that is applied to the building management system in FIG. 1.

FIG. 6 shows an exemplary connection topology of the network analysis device 101 according to this embodiment that is applied to the building management system 100 in FIG. 1. As shown in FIG. 6, network-dedicated protocol analyzers 501 and 502 are each connected to either end of the gateway device 403. The protocol analyzer 501 analyzes packets transferred on the building management system network 11 and outputs the packets and analysis results as first electronic message information. The protocol analyzer 502 analyzes packets transferred on the equipment network 12 and outputs the packets and analysis results as second electronic message information.

The network analysis device 100 is a computer having the capability of communication. The network analysis device 100 executes programs stored therein to execute a given procedure based on the output of the protocol analyzers 501 and 502.

The network analysis device 101 comprises electronic message information collectors 102 and 103. The electronic message information collector 102 is connected to the protocol analyzer 501. The electronic message information collector 103 is connected to the protocol analyzer 502. The network analysis device 101 collects the packets and analysis results (namely, first and second electronic message information) output from the protocol analyzers 501 and 502 using the electronic message information collectors 102 and 103. In this embodiment, the electronic message information collectors 102 and 103 correspond to the first electronic message information collector and the second electronic message information collector.

Figure 7:
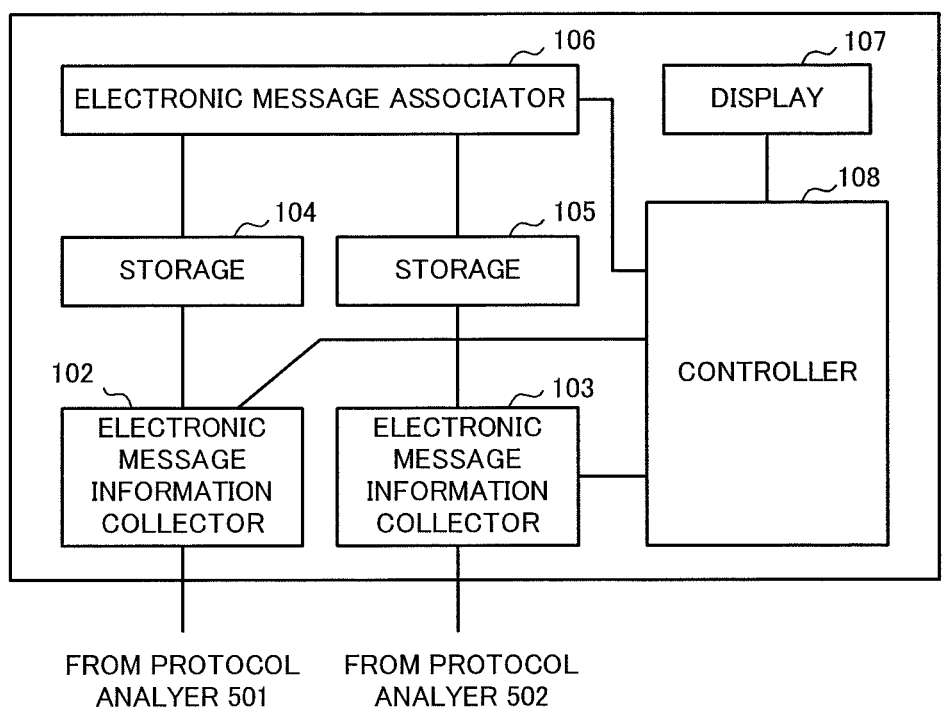
FIG. 7 is a block diagram showing the general configuration of the network analysis device in FIG. 6.

FIG. 7 shows the general configuration of the network analysis device 101 according to this embodiment. As shown in FIG. 7, the network analysis device 101 comprises, in addition to the above-described electronic message information collectors 102 and 103, storages 104 and 105, a electronic message associator 106, a display 107, and a controller 108.

The electronic message information collector 102 collects, as described above, the packets transferred on the building management system network 11 and analyzed by the protocol analyzer 501 and their analysis results as first electronic message information. The electronic message information collector 103 collects, as described above, the packets transferred on the equipment network 12 and analyzed by the protocol analyzer 502 and their analysis results as second electronic message information. The storage 104 stores the packets and analysis results collected by the electronic message information collector 102. The storage 105 stores the packets and analysis results collected by the electronic message information collector 103.

The electronic message associator 106 associates the first electronic message information and the second electronic message information stored in the storages 104 and 105. More specifically, the electronic message associator 106 detects the corresponding packets based on the analysis results stored in the storages 104 and 105 and the information of protocol interconversion scheme executed within the gateway device 403, and associates the electronic message information of the detected packets.

The association is conducted based on, for example, the packet session numbers or packet identification numbers obtained as a result of analysis. For example, the packet 404 shown in FIG. 2 and the packet 405 shown in FIG. 3 or the packet 406 shown in FIG. 4 and the packet 407 shown in FIG. 5 are associated here. Alternatively, the message associator 106 may associate all of a series of packets 404, 405, 406, and 407. Incidentally, the correspondence between the packets 404 and 405 or between the packets 406 and 407 will be known because they are given the same identification number or an identification number converted according to some conversion rule within the gateway device 403. Furthermore, the correspondence among a series of packets 404, 405, 406, and 407 will be known because they are given the same session number or a session number converted according to some conversion rule within the gateway device 403. Incidentally, the above-described protocol interconversion scheme information includes command interconversion rules.

The display 107 displays the association results of packets associated by the electronic message associator 106. The controller 108 controls the electronic message information collectors 102 and 103, the electronic message associator 106, and the display 107. Furthermore, the controller 108 changes the display contents of the display 107 according to input of operation using a pointing device such as a mouse.

Figure 8:
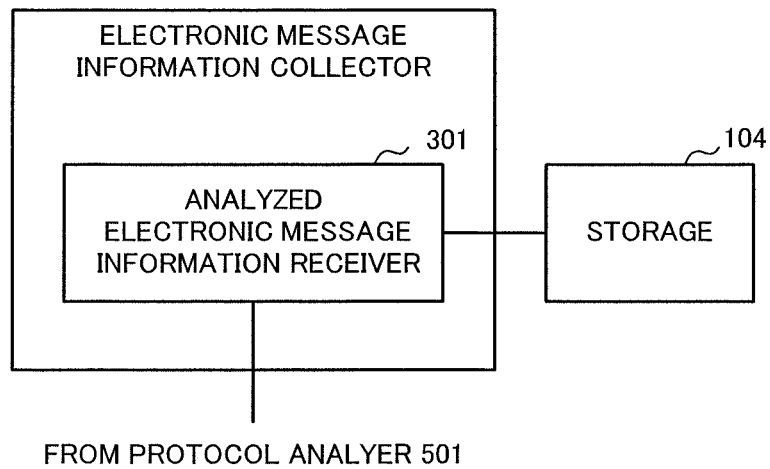
FIG. 8 is a block diagram showing the general configuration of the electronic message information collector in FIG. 7.

In this embodiment, the electronic message information collector 102 comprises an analyzed electronic message information receiver 301 as shown in FIG. 8. The packets and analysis results (electronic message information of analyzed packets) received from the protocol analyzer 501 are received by the analyzed electronic message information receiver 301 and stored in the storage 104. Here, the electronic message information collector 103 has the same configuration as the one shown in FIG. 8.

Operation of the network analysis device 101 according to this embodiment will be described hereafter.

Figure 9:
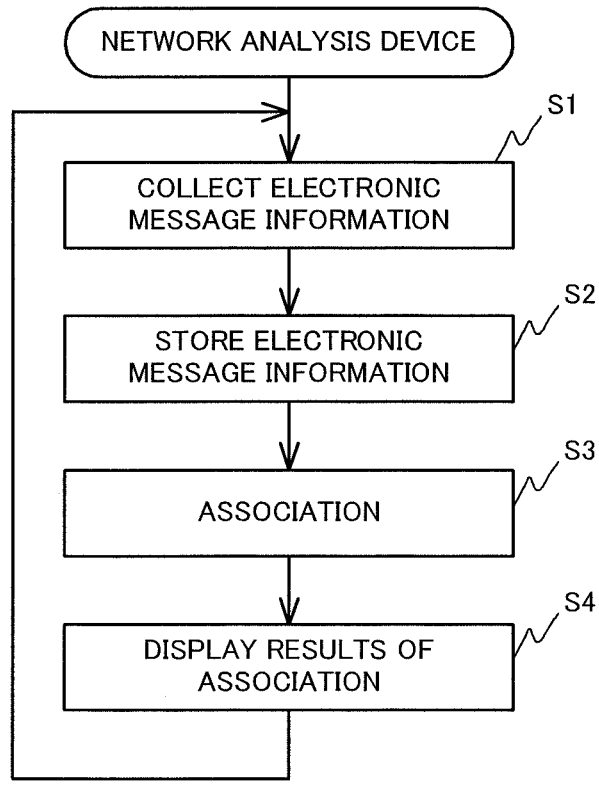
FIG. 9 is a flowchart of the processing of the network analysis device in FIG. 6.

FIG. 9 shows a processing flow of the network analysis device 101. As shown in FIG. 9, first, in the network analysis device 101, the controller 108 directs the electronic message information collectors 102 and 103 to collect electronic message information (first and second electronic message information) from the protocol analyzers 501 and 502 (Step S1). This Step S1 corresponds to the first and second electronic message information collecting steps. Incidentally, this step is executed, for example, each time the packets 404 to 407 are transferred on the building management system network 11 and the equipment network 12 and the protocol analyzers 501 and 502 output the packets 404 to 407 and their analysis results.

Subsequently, the controller 108 directs the electronic message information collectors 102 and 103 to store the collected first and second electronic message information in the stores 104 and 105 (Step S2). This Step S2 corresponds to the first and second storing steps.

Subsequently, the controller 108 directs the electronic message associator 106 to associate the first electronic message information stored in the storage 104 and the second electronic message information stored in the storage 105 (Step S3). This Step S3 corresponds to the electronic message associating step. Incidentally, this step is executed after a length of time sufficient for targeted electronic message information and electronic message information to be associated to be transferred on the networks has elapsed.

In the Step S3, the electronic message associator 106 searches the first and second electronic message information for the other electronic message to be associated based on the above-described protocol interconversion scheme information, and detects the electronic message corresponding to the electronic message information for which no electronic message information of the other electronic message to be associated was found to be an abnormal electronic message. In other words, in the event that the electronic message information of a presumably existing other electronic message to be associated is not found in the first and second electronic message information, the electronic message associator 106 determines that the electronic message corresponding to the electronic message information is an abnormal electronic message. Furthermore, the electronic message associator 106 counts the number of electronic messages determined to be abnormal electronic messages.

Here, it is possible that the electronic message associator 106 yields the presence/absence of abnormal electronic messages as information regarding abnormal electronic messages instead of the number of abnormal electronic messages.

Furthermore, the electronic message associator 106 retains the electronic messages determined to be abnormal electronic messages with the addition of uniquely assigned electronic message index numbers. Furthermore, the electronic message associator 106 creates data for a list of electronic messages determined to be abnormal electronic messages. The data are created according to the above-mentioned electronic message index numbers. Furthermore, information of the link to the electronic message information stored in the storages 104 and 105 is added to the items on the list.

Subsequently, the controller 108 directs the display 107 to display the results of association by the electronic message associator 106 (Step S4). In this embodiment, this Step S4 corresponds to the display step. Here, the display 107 displays information regarding the determined abnormal electronic messages. More specifically, the display 107 displays the number of abnormal electronic messages counted by the electronic message associator 106. Viewing this display, the worker can acknowledge the presence/absence of occurrence of abnormal events in one glance.

If there are multiple abnormal electronic messages and the worker clicks on the number of abnormal electronic messages displayed by the display 107 with his mouse, the controller 108 directs the display 107 to display a list of abnormal electronic messages based on the electronic message index numbers. Furthermore, if the worker clicks on one of the items on the list of electronic message index numbers of the abnormal electronic messages displayed by the display 107, the controller 108 directs the display 107 to display the corresponding electronic message information, namely the content and analysis result of the electronic message.

Figure 10:
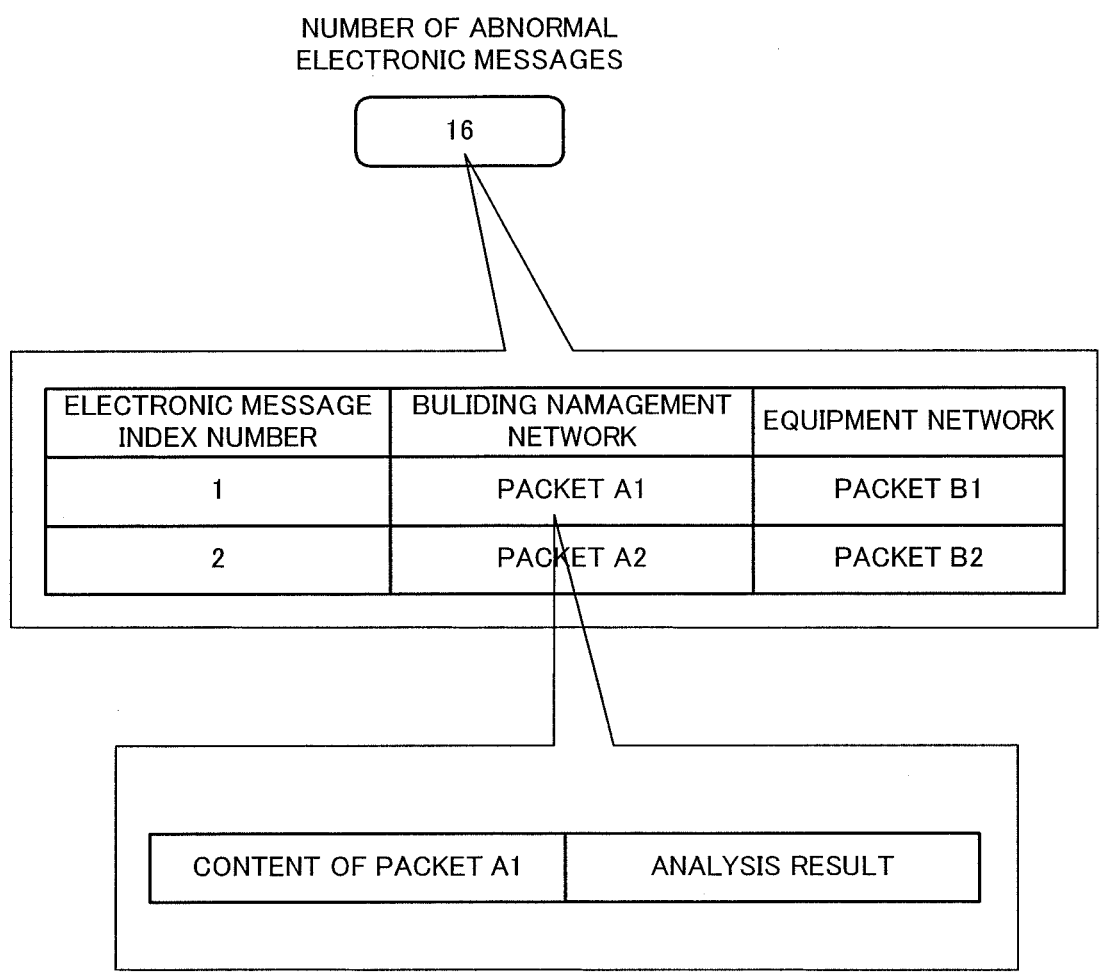
FIG. 10 is an illustration showing an example of information regarding abnormal electronic messages displayed on the display.

For example, it is assumed that the number of abnormal electronic messages displayed by the display 107 is 16, as shown in FIG. 10. If the number "16" is clicked with the mouse, a list of abnormal electronic messages based on the electronic message index numbers is displayed. Then, an item "PACKET A1" on the list is clicked with the mouse, the content and analysis result of the PACKET A1 are displayed.

The network analysis device 101 receives and stores the packets transferred on the building management system network 11 and the equipment network 12 and analyzed by the protocol analyzers 501 and 502 and their analysis results. Furthermore, the network analysis device 101 associates the electronic message information with each other and displays the association results. In this way, the analysis results are presented to the worker in which the packets travelling on multiple networks are mutually associated. Then, it is possible to easily acknowledge the situation and identify where the problem occurred and what the problem is in a short time. Consequently, the worker can analyze abnormal electronic messages more efficiently.

The network analysis device 101 according to this embodiment receives the packets and analysis results thereof output from the protocol analyzers 501 and 502. In this way, an efficient analysis work is available without newly developing an existing protocol analyzer (without extra cost). It is not always necessary to provide a protocol analyzer to each of the building management system network 11 and the equipment network 12. A single protocol analyzer analyzing the packets transferred on both the building management system network 11 and the equipment network 12 may be used.

Embodiment 2

Embodiment 2 of the present disclosure will be described hereafter.

Figure 11:
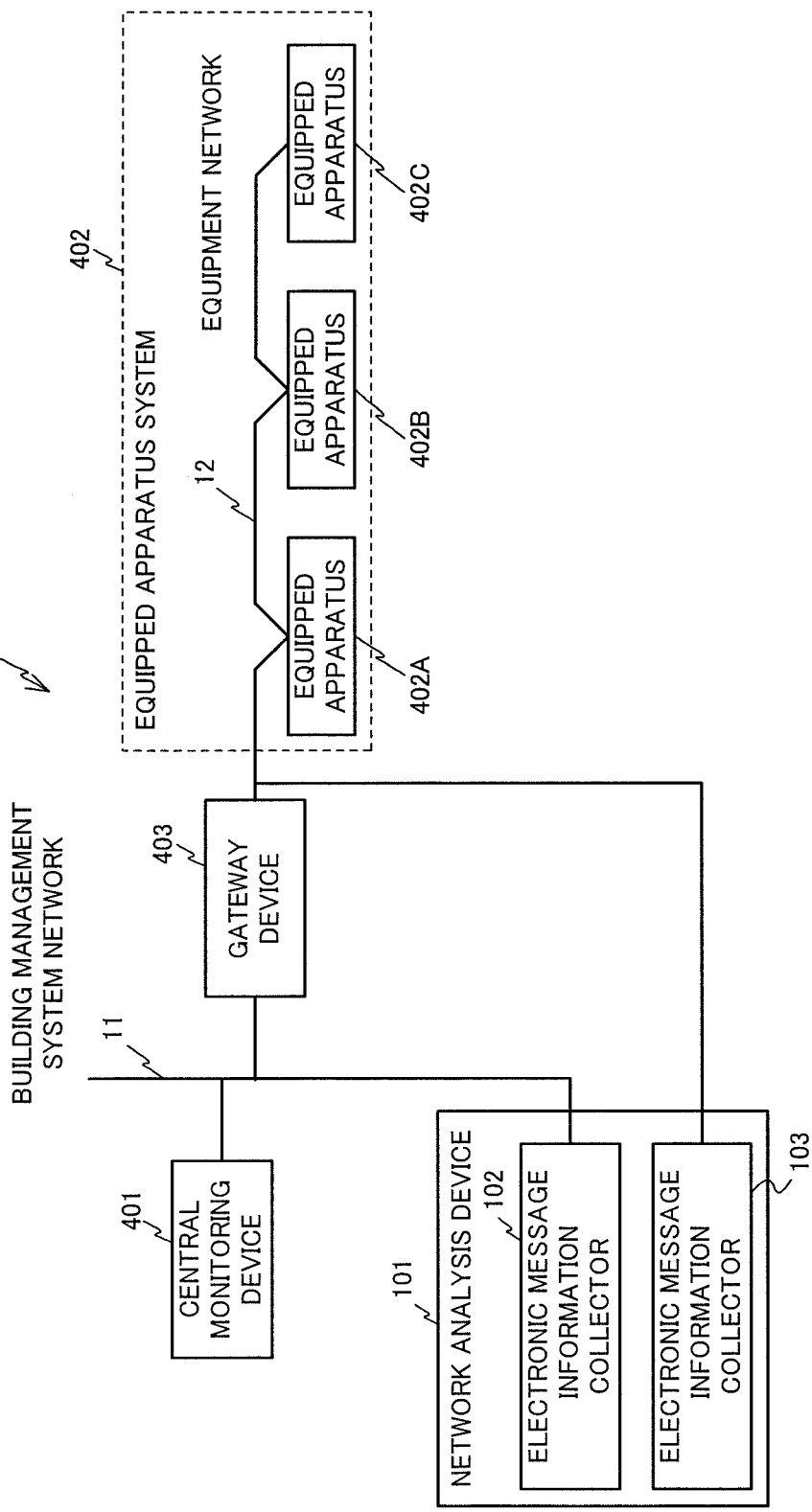
FIG. 11 is a block diagram showing an exemplary connection topology of the network analysis device according to Embodiment 2 that is applied to the building management system in FIG. 1.

FIG. 11 shows the connection topology of the network analysis device according to this embodiment that is applied to the management system in FIG. 1. As shown in FIG. 11, the network analysis device 101 is directly connected to the networks on either end of the gateway device 403 (the building management system network 11 and the equipment network 12).

Figure 12:
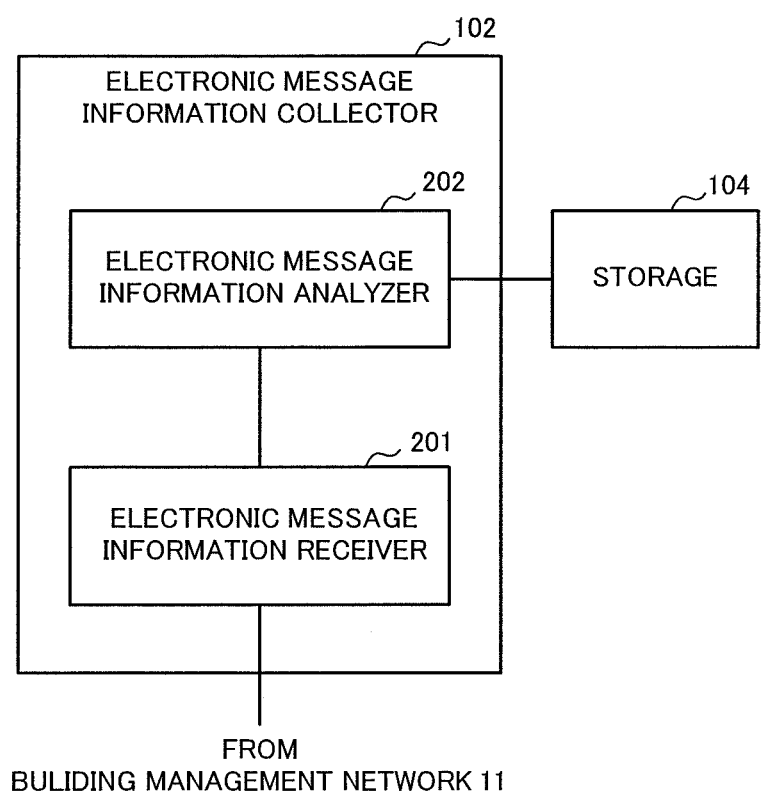
FIG. 12 is a block diagram showing the general configuration of the electronic message information collector in FIG. 11.

FIG. 12 shows the general configuration of the electronic message information collector 102 of the network analysis device 101 according to this embodiment. As shown in FIG. 12, the electronic message information collector 102 comprises an electronic message information receiver 201 and an electronic message information analyzer 202.

The electronic message information receiver 201 sequentially extracts and collects packets transferred on the networks as first electronic message information. The electronic message information analyzer 202 analyzes the received packets. The electronic message information collector 103 has the same configuration as the one shown in FIG. 12. The electronic message information analyzer 202 corresponds to the protocol analyzers 501 and 502 according to the above-described Embodiment 1. The packets and analysis results (first and second electronic message information) output from the electronic message information analyzer 202 are stored in the storage 104 as in the above-described Embodiment 1. In this embodiment, the electronic message information analyzer 202 corresponds to the first and second analyzers.

In this embodiment, the electronic message information collectors 102 and 103 collects (sequentially extracts) packets directly and analyzes the electronic messages. In this way, the packets transmitted/received by the gateway device 403 and transferred on the building management system networks 11 and 12 can be collected without providing a protocol analyzer. Consequently, the worker does not need to bring a protocol analyzer to the site, and the worker can reduce the items to bring with him. Furthermore, because a protocol analyzer is unnecessary, the work space for placing a protocol analyzer is saved.

Embodiment 3

Embodiment 3 of the present disclosure will be described hereafter.

Figure 13:
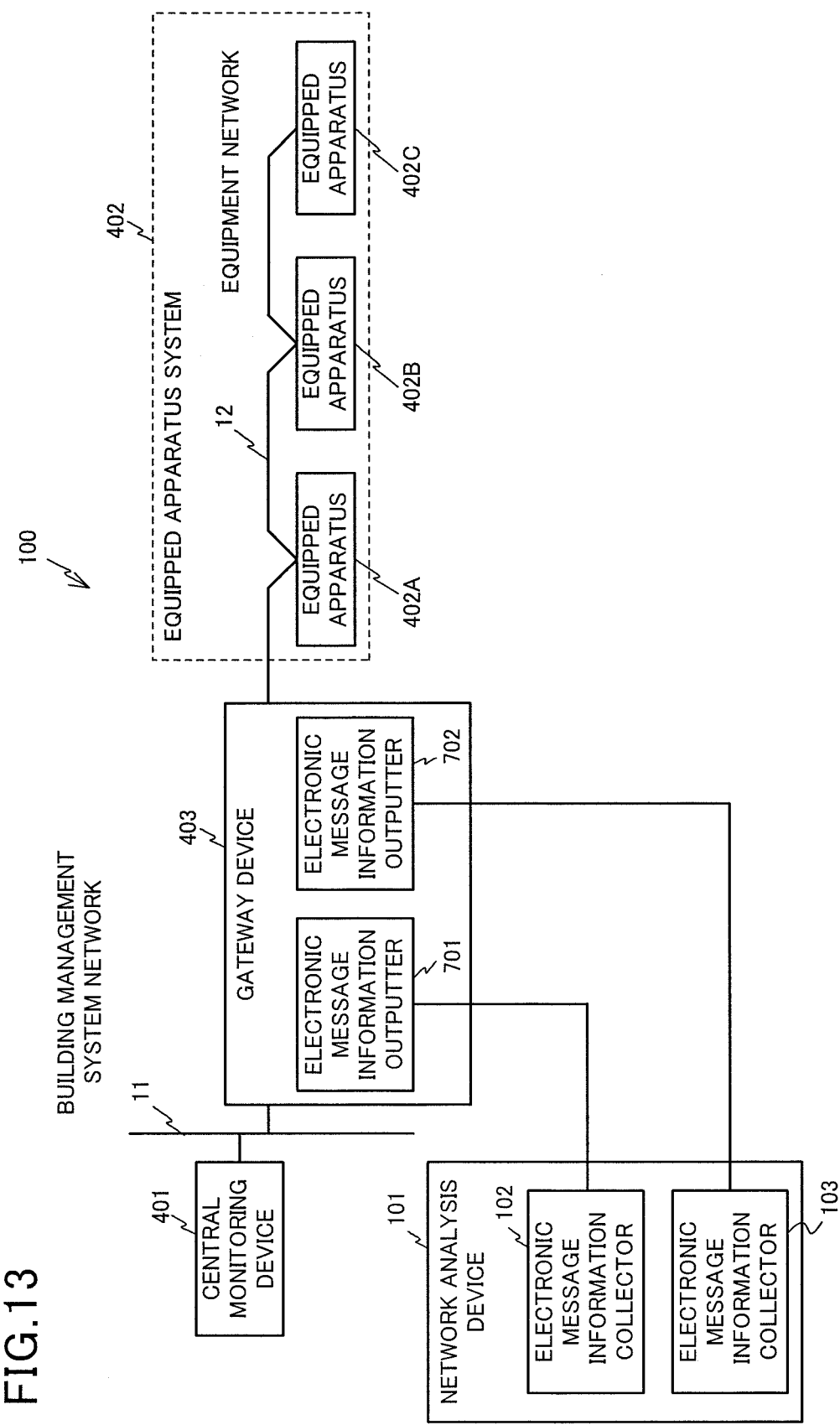
FIG. 13 is a block diagram showing an exemplary connection topology of the network analysis device according to Embodiment 3 that is applied to the building management system in FIG. 1.

FIG. 13 shows an exemplary connection topology of the network analysis device 101 according to this embodiment that is applied to the management system 100 in FIG. 1. As shown in FIG. 13, in this embodiment, the gateway device 403 comprises electronic message information outputters 701 and 702.

The electronic message information outputter 701 accumulates a given number of packets received from the building management system network 11 and outputs the packets at a time. The electronic message information outputter 702 accumulates a given number of packets received from the equipment network 12 and outputs the packets at a time.

In the network analysis device 101, the electronic message information collector 102 collects the packets output from the electronic message information outputter 701 at a time and the electronic message information collector 103 collects the packets output from the electronic message information outputter 702 at a time.

Incidentally, the configuration shown in FIG. 8 or the configuration shown in FIG. 10 may be selected as the configuration of the electronic message information collectors 102 and 103 as appropriate according to the output contents from the electronic message information outputters 701 and 702.

With this embodiment, the network analysis device 101 can collect the packets from the gateway device 403 at a time, whereby the workload is reduced.

Embodiment 4

Embodiment 4 of the present disclosure will be described hereafter.

Figure 14:
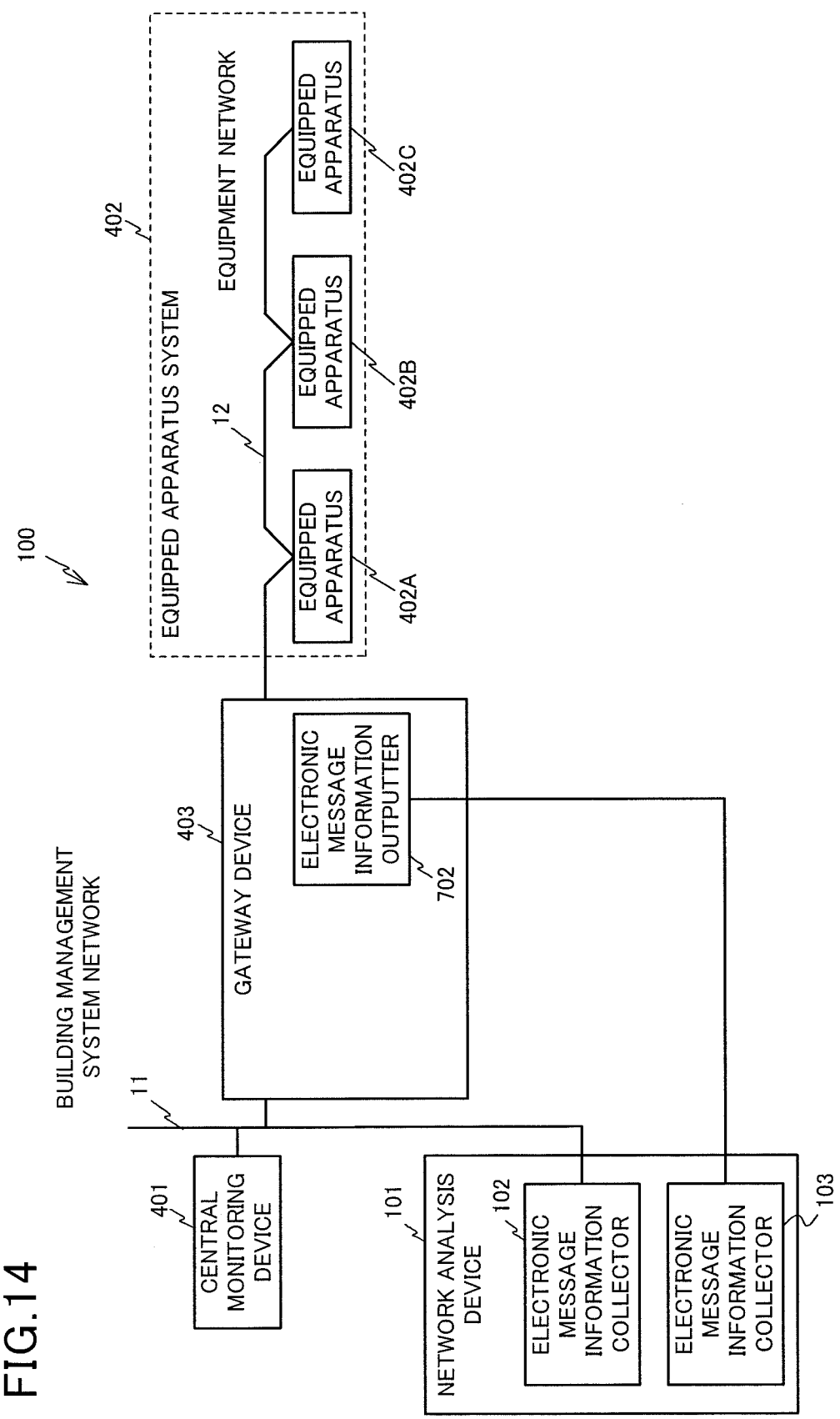
FIG. 14 is a block diagram showing an exemplary connection topology of the network analysis device according to Embodiment 4 that is applied to the building management system in FIG. 1.

FIG. 14 shows an exemplary connection topology of the network analysis device 101 according to this embodiment that is applied to the management system 100 in FIG. 1. As shown in FIG. 14, this network analysis device 101 collects packets transferred on the building management system network 11 directly. On the other hand, as for packets transferred on the equipment network 12, the network analysis device 101 receives and collects packets output from the electronic message information outputter 702 within the gateway device 403 at a time.

In either case, the packets collected by the electronic message information collectors 102 and 103 are respectively stored in the storages 104 and 105. The electronic message associator 106 associates and analyzes the packets. The association analysis results are displayed by the display 107. The controller 108 conducts this series of processing.

As described above, the configuration to collect and analyze electronic message information on the building management system network 11 and the configuration to collect and analyze electronic message information on the equipment network 12 are not necessarily the same.

As described above in detail, using the network analysis device 101 and the network analysis method according to the above-described embodiments, the electronic message information of packets transferred on the building management system network 11 and the electronic message information of packets transferred on the equipment network 12 can be presented to the worker in a mutually associated manner. Thus, the worker can easily acknowledge the situation and identify where the problem occurred and what the problem is in a short time. Consequently, the work efficiency in analyzing electronic messages travelling on multiple networks connected to each other can be improved.

In the above-described embodiments, the building management system 100 comprises two networks, the building management system network 11 and the equipment network 12. However, the present disclosure is not confined thereto. Three or more networks may be present. For example, the present disclosure is useful for a case in which multiple lower-level networks are connected to an upper-level network. In such a case, the network analysis device 101 needs to comprise an interface for collecting packets transferred on those networks. Furthermore, the present disclosure has no restriction on the number of equipped apparatuses. Furthermore, the present disclosure can be used to manage any network system comprising multiple networks other than the building management systems.

Incidentally, in the above-described embodiments, the programs executed by the network analysis device 101 or the like may be stored and distributed on a computer-readable recording medium such as a flexible disc, CD-ROM (compact disc read only memory), DVD (digital versatile disc), and MO (magneto-optical disc), and installed to configure a system executing the above-described threads.

Furthermore, the programs may be stored in a disc device or the like of a given server unit on a communication network such as the Internet and, for example, superimposed on a carrier wave and downloaded.

Furthermore, when the above-described functions are realized by an OS (operating system) in part or realized by cooperation of an OS and application, only the non-OS part may be stored and distributed on a medium, or downloaded.

Various embodiments and modifications are available to the present disclosure without departing from the broad sense of spirit and scope of the present disclosure. The above-described embodiments are given for explaining the present disclosure and do not confine the scope of the present disclosure. In other words, the scope of the present disclosure is set forth by the scope of claims, not by the above-described embodiments. Various modifications made within the scope of claims and scope of significance of the invention equivalent thereto are considered to fall under the scope of the present disclosure.

INDUSTRIAL APPLICABILITY

The present disclosure is suitable for analyzing a network constituted by multiple networks such as a building management system network.

REFERENCE SIGNS LIST

11 Building management system network
12 Equipment network
100 Building management system
101 Network analysis device
102 Electronic message information collector
103 Electronic message information collector
104 Storage
105 Storage
106 Electronic message associator
107 Display
108 Controller
201 Electronic message information receiver
202 Electronic message information receiver
301 Analyzed electronic message information receiver
401 Central monitoring device
402 Equipped apparatus system
403 Gateway device
402A, 402B, 402C Equipped apparatus
404, 405, 406, 407 Packet
501, 502 Protocol analyzer
701, 702 Electronic message information outputter

The invention claimed is:

1. A network analysis device, comprising:
an electronic message collector collecting electronic messages, the electronic message collector including a first electronic message information collector collecting first electronic message information regarding electronic messages transferred on a first network and a second electronic message information collector collecting second electronic message information regarding electronic messages transferred on a second network;
a first storage storing the first electronic message information collected by the first electronic message information collector;
a second storage storing the second electronic message information collected by the second electronic message information collector; and
an electronic message associator associating the first electronic message information stored in the first storage and the second electronic message information stored in the second storage based on protocol interconversion scheme information between the first network and the second network, wherein
the electronic message associator determines a collected electronic message unassociated with stored electronic message information to be an abnormal electronic message, counts each electronic message determined to be abnormal electronic messages, and outputs a number of counted electronic messages and information regarding whether the determined abnormal electronic message transferred on the first network or the second network to a display.

2. The network analysis device according to claim 1, wherein
the electronic message associator creates data for a list of electronic messages determined to be abnormal electronic messages and outputs the data created to the display.

3. The network analysis device according to claim 1, further comprising:
a first analyzer analyzing electronic messages transferred on the first network; and
a second analyzer analyzing electronic messages transferred on the second network, wherein
the first electronic message information collector collects the electronic messages and analysis results analyzed by the first analyzer as the first electronic message information, and
the second electronic message information collector collects the electronic messages and analysis results analyzed by the second analyzer as the second electronic message information.

4. The network analysis device according to claim 1, wherein
at least one of the first electronic message information collector and the second electronic message information collector sequentially extracts and collects the electronic messages received by a gateway device connecting the first network and the second network.

5. The network analysis device according to claim 1, wherein
at least one of the first electronic message information collector and the second electronic message information collector extracts and collects the electronic messages accumulated by a gateway device connecting the first network and the second network at a time.

6. A management system, comprising:
a gateway device capable of accumulating electronic messages transferred on at least one of the first network and the second network and outputting the electronic messages at a time; and
the network analysis device according to claim 5.

7. A network analysis method, comprising:
collecting electronic messages including first electronic message information regarding electronic messages transferred on a first network and second electronic message information regarding electronic messages transferred on a second network;
storing in a first storage the collected first electronic message information;
storing in a second storage the collected second electronic message information; and
associating the first electronic message information stored in the first storage and the second electronic message information stored in the second storage based on protocol interconversion scheme information between the first network and the second network, wherein the associating includes determining that a collected electronic message unassociated with stored electronic message information is an abnormal electronic message counting each abnormal electronic message, and outputting a number of counted electronic messages and information regarding whether the determined abnormal electronic message transferred on the first network or the second network to a display.

8. A non-transitory computer-readable recording medium storing a program allowing a computer to function as:
an electronic message collector collecting electronic messages, the electronic message collector including a first electronic message information collector collecting first electronic message information regarding electronic messages transferred on a first network and a second electronic message information collector collecting second electronic message information regarding electronic messages transferred on a second network;
a first storage storing the first electronic message information collected by the first electronic message information collector;
a second storage storing the second electronic message information collected by the second electronic message information collector; and
an electronic message associator associating the first electronic message information stored in the first storage and the second electronic message information stored in the second storage based on protocol inter-conversion scheme information between the first network and the second network, wherein the associating of the electronic message associator determines that an electronic message unassociated with stored electronic message information is an abnormal electronic message counts each electronic message determined to be abnormal electronic messages, and outputs a number of counted electronic messages and information regarding whether the determined abnormal electronic message transferred on the first network or the second network to a display.

* * * * *